United States Patent
Park

(10) Patent No.: US 7,773,188 B2
(45) Date of Patent: Aug. 10, 2010

(54) LIQUID CRYSTAL DISPLAY DEVICE AND METHOD OF MANUFACTURING THE SAME

(75) Inventor: Seon Young Park, Paju Si (KR)

(73) Assignee: LG Display Co., Ltd., Seoul (KR)

(*) Notice: Subject to any disclaimer, the term of this patent is extended or adjusted under 35 U.S.C. 154(b) by 267 days.

(21) Appl. No.: 11/785,688

(22) Filed: Apr. 19, 2007

(65) Prior Publication Data

US 2007/0247583 A1 Oct. 25, 2007

(30) Foreign Application Priority Data

Apr. 20, 2006 (KR) .................... 10-2006-0035744

(51) Int. Cl.
  G02F 1/1339 (2006.01)
  G02F 1/13 (2006.01)
(52) U.S. Cl. ..................... 349/155; 349/187
(58) Field of Classification Search ................ None
  See application file for complete search history.

(56) References Cited

U.S. PATENT DOCUMENTS

| 6,649,221 B1* | 11/2003 | Tateno et al. ............. 427/469 |
| 2003/0098943 A1* | 5/2003 | Park et al. ................ 349/155 |
| 2007/0019148 A1* | 1/2007 | Ueda ...................... 349/155 |

* cited by examiner

*Primary Examiner*—Michelle R Connelly Cushwa
(74) *Attorney, Agent, or Firm*—Birch, Stewart, Kolasch & Birch, LLP

(57) ABSTRACT

An LCD device and a method of manufacturing the same are discussed. According to an embodiment, the method includes preparing first and second substrates; and spraying spacers on the first or second substrate through an ink-jet process, wherein the spacers including both positively charged spacers and negatively charged spacers are sprayed on the first or second substrate, thereby preventing the spots and the deterioration of luminance caused by the movement of spacers.

14 Claims, 3 Drawing Sheets

LIQUID CRYSTAL DISPLAY DEVICE AND METHOD OF MANUFACTURING THE SAME

This application claims the priority benefit of Korean Patent Application No. 10-2006-0035744 filed on Apr. 20, 2006, which is hereby incorporated by reference as if fully set forth herein.

BACKGROUND OF THE INVENTION

1. Field of the Invention

The present invention relates to a liquid crystal display (LCD) device, and more particularly, to an LCD device including a spacer to maintain a cell gap, and a method of manufacturing the same.

2. Discussion of the Related Art

Among various ultra-thin flat type display devices, which include a display screen having a thickness of several centimeters (cm), an LCD device has been widely used for notebook computers, monitors and aircrafts owing to the advantageous properties of low power consumption and portability.

In case of the small-sized LCD device, a cell gap of the LCD device is maintained only by a sealant to bond the two substrates of the LCD device. However, as the LCD device increases in size, it is difficult to maintain the constant cell gap formed in the central portion of the panel by the sealant formed in the edge of the panel. In this respect, the large-sized LCD device necessarily requires an additional spacer to maintain the constant cell gap.

Hereinafter, a method of forming a spacer in a related art LCD device will be explained with reference to the accompanying drawings.

FIG. 1 is a perspective view of a related art method of forming a ball spacer in a process of manufacturing an LCD device.

Referring to FIG. 1, a spraying nozzle 30 is positioned above a substrate 20 which is loaded on a stage 10. Then, ball spacers 40 are sprayed on the entire surface of substrate 20 through the spraying nozzle 30. Also, a sealant 50 is formed in the edge of substrate 20.

The process of forming the ball spacer 40 includes either a wet spray method or a drying spray method on the basis whether the ball spacers 40 sprayed through the spraying nozzle 30 are mixed with solvent or gas.

In the wet spray method, the ball spacers 40 mixed with the solvent are sprayed on the substrate 20. This method has the advantage in that the ball spacers 40 are sprayed on the substrate 40 evenly. However, the ball spacers 40 lump easily in the process of mixing the ball spacers 40 with the solvent.

In the drying spray method, the ball spacers 40 mixed with nitrogen gas ($N_2$) are sprayed on the substrate 20. This method has the advantage in that the ball spacers are not lumped easily. In the drying spray method, however, it is difficult to evenly spray the ball spacers 40 on the entire surface of substrate 20.

For the both wet and drying spray methods, the ball spacers 40 are sprayed on the entire surface of substrate 20. As the ball spacers 40 are sprayed, the ball spacers 40 are irregularly arranged on the substrate 20. Also, the ball spacers 40 may be sprayed on pixel regions, whereby the picture quality is degraded.

In order to address this limitation where the picture quality is degraded, a method of forming a column spacer in non-pixel regions has been proposed. The process of forming the column spacer uses a photolithography.

Since the column spacers are formed in the non-pixel regions, it is possible to prevent the picture quality from being degraded. However, the photolithography requires a high-priced mask and exposure apparatus, whereby the manufacturing cost is increased. Further, after forming the column spacers, it is necessary to inspect whether the column spacers have the constant height.

SUMMARY OF THE INVENTION

Accordingly, the present invention is directed to an LCD device and a method of manufacturing the same that substantially obviates one or more problems due to limitations and disadvantages of the related art.

An object of the present invention is to provide an LCD device in which spacers are formed in a non-pixel region to prevent a picture quality from being degraded without using photolithography, and a method of manufacturing the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of manufacturing an LCD device according to an embodiment comprises preparing first and second substrates; and spraying spacers on the first or second substrate through an ink-jet process, wherein the spacers include both positively charged spacers and negatively charged spacers.

In another aspect, an apparatus for manufacturing an LCD device comprises a spacer supplier which supplies positively charged spacers and negatively charged spacers; and at least one spraying nozzle which sprays the spacers supplied from the spacer supplier on at least one of first and second substrates using an ink-jet process.

In another aspect, an LCD device comprises first and second substrates facing each other with a liquid crystal layer therebetween; and positively charged spacers and negatively charged spacers, provided between the first and second substrates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Hereinafter, an LCD device according to the present invention and a method of manufacturing the same will be explained with reference to the accompanying drawings.

First Embodiment

Figure 1:
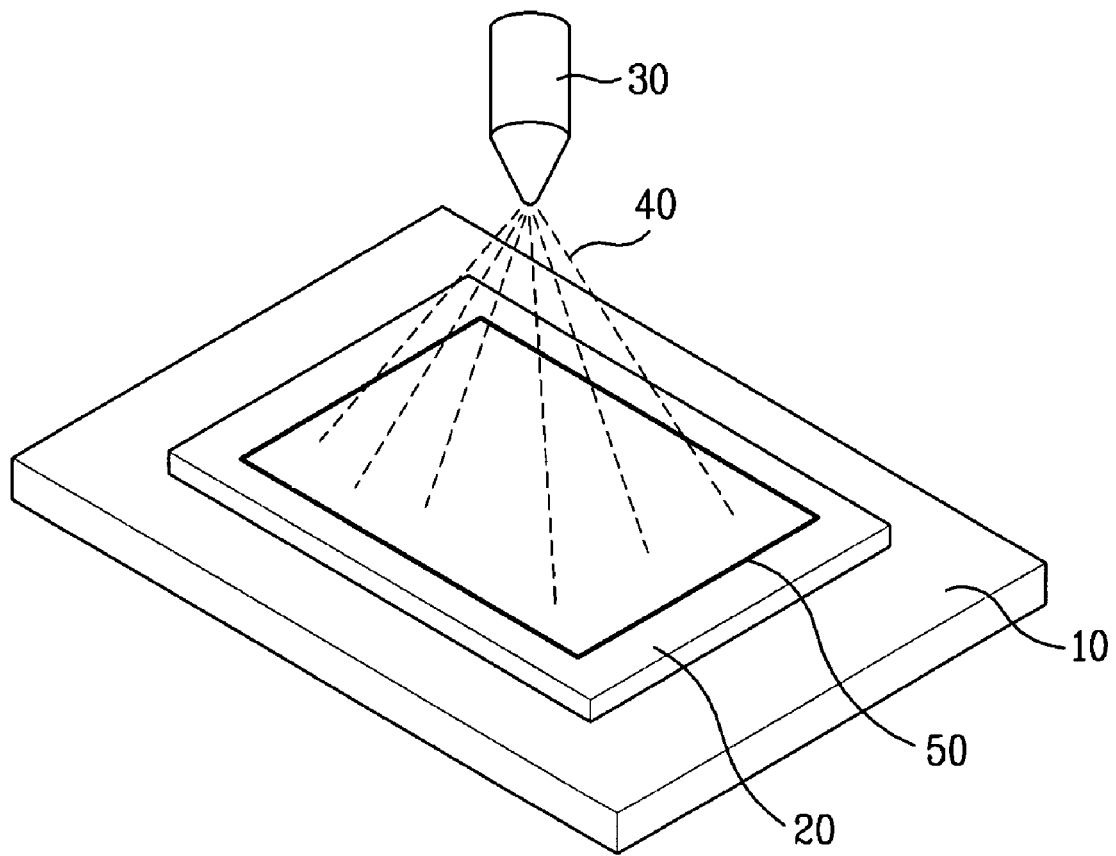
FIG. 1 is a perspective view of roughly illustrating a method of forming a ball spacer of an LCD device according to the related art.
Figure 2:
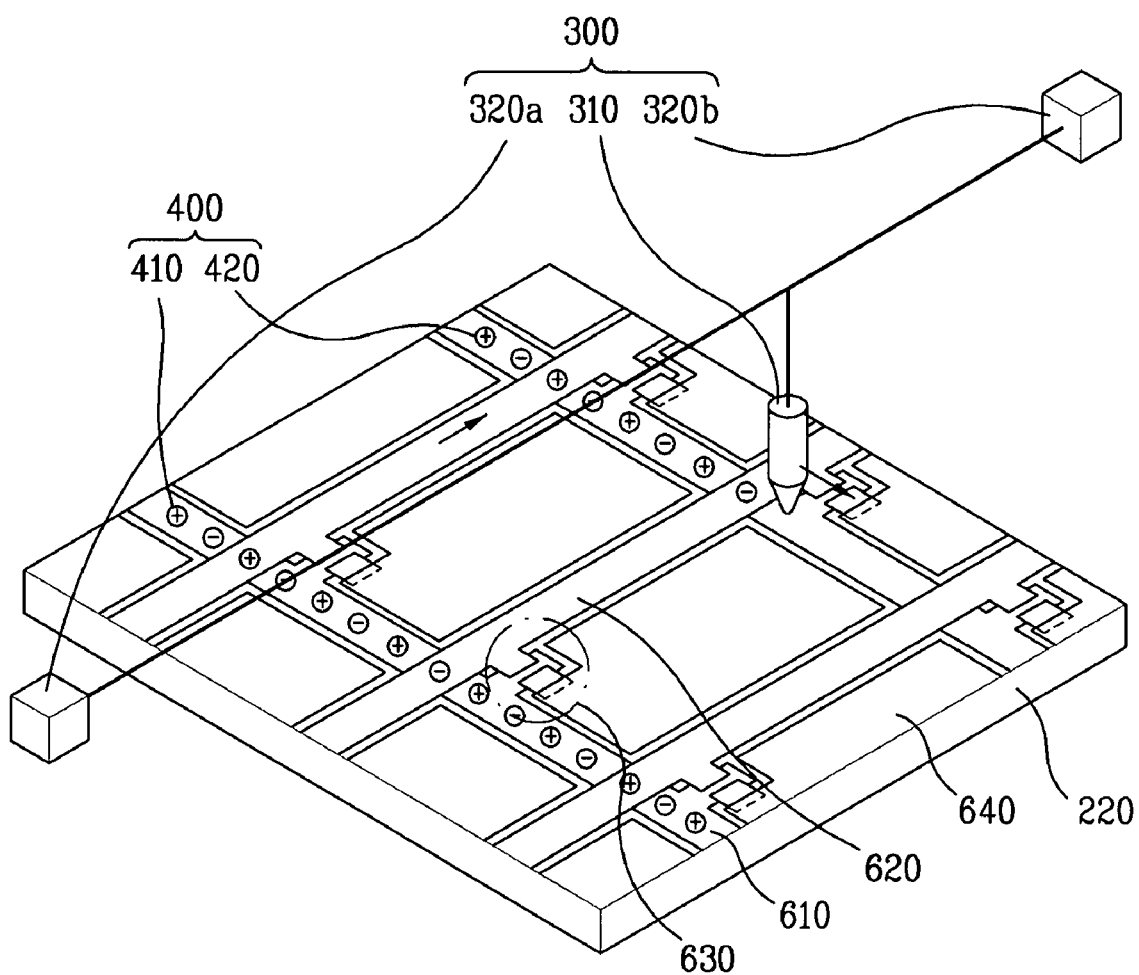
FIG. 2 is a perspective view of roughly illustrating a method of spraying spacers according to a first embodiment of the present invention.

FIG. 2 is a perspective view of roughly illustrating a method of spraying spacers according to the first embodiment of the present invention.

Referring to FIG. 2, an ink-jet spraying apparatus 300 is positioned above a lower substrate 220 of which edges are coated with a sealant (not shown). Through the ink-jet spraying apparatus 300, ball spacers 400 are sprayed on the lower substrate 220.

The lower substrate 220 includes a plurality of gate lines 610, a plurality of data lines 620 crossing the gate lines to define a plurality of unit pixel regions, a thin film transistor 630 at each unit pixel region and a pixel electrode 640 at each unit pixel region. In this case, the gate lines 610 are formed in perpendicular to the data lines 620, thereby defining the unit pixel regions. Also, each thin film transistor 630 is formed adjacent to a crossing of the gate and data lines 610 and 620, wherein the thin film transistor 630 functions as a switching element. Then, each pixel electrode 640 is electrically connected with the corresponding thin film transistor 630, wherein the pixel electrode 640 applies an electric field to a liquid crystal layer (not shown) on the basis of signal supplied from the thin film transistor 630.

Although not shown, an alignment layer may be formed on the lower substrate 220, to regularly align liquid crystal molecules of the liquid crystal layer at a predetermined direction.

Excluding the pixel electrode 640 of the lower substrate 220, the gate lines 610, the data lines 620 and the thin film transistor 630 correspond to non-pixel regions. At this time, the ball spacers 400 are sprayed on the non-pixel regions including the gate lines 610, the data lines 620 and the thin film transistors 630. As a variation, the ball spacers 400 can be sprayed on the pixel regions which only include the gate lines 610 and/or the data lines 620 and/or the thin film transistors 630.

For instance, FIG. 2 illustrates an example of spraying the ball spacers 400 on the portions corresponding to the gate lines 610. However, the ball spacer 400 may be sprayed on the portions corresponding to the thin film transistors 630, or on the portions corresponding to the gate line 610, the data line 620 and the thin film transistor 630.

For the ball spacers 400, spacers 410 that are positively charged are mixed with spacers 420 that are negatively charged, and the mixed spacers 410 and 420 are sprayed on the lower substrate 220.

Preferably, the spacers 400 of the present invention are sprayed only on the non-pixel regions by the ink-jet spacer spraying apparatus 300. However, in the related art, if for some reason spacers are sprayed on a flat surface, for example, an alignment layer (not shown), these spacers may move, e.g., towards the pixel regions, which is a problem.

In contrast, if the spacers 400 according to the present invention are sprayed on the lower substrate 220, it is possible to prevent the ball spacers 400 from moving to undesirable regions such as the pixel regions because of the electric attractive force between the positively and negatively charged spacers 410 and 420. The ball spacers 400 are generally formed of a plastic material. Thus, preferably the ball spacers 400 may be charged negatively or positively by the frictional electricity or using other techniques. Preferably, the number of spacers 410 positively charged is the same as the number of spacers 420 negatively charged so as to maintain the balance of electric attractive force between the positively and negatively charged spacers 410 and 420. However, different numbers of positively and negatively charged spacers may be used if desired.

The ink-jet spacer spraying apparatus 300 comprises a spraying nozzle 310 and a spacer supplier 320.

The spraying nozzle 310 sprays the ball spacers 400 supplied from the spacer supplier 320 onto the lower substrate 220. In another example, at least two spraying nozzles respectively spraying the positively charged spacers and the negatively charged spacers may be used. At this time, the ball spacers 400 supplied from the spacer supplier 320 can be mixed with a volatile solvent. In this case, the volatile solvent makes the ball spacers 400 to be coated or deposited on the substrate 220 evenly and smoothly. Just after the ball spacers 400 are sprayed on the lower substrate 220, the volatile solvent is vaporized.

According to an embodiment, the spacer supplier 320 comprises a first spacer supplier 320a which supplies the positively charged spacers 410, and a second spacer supplier 320b which supplies the negatively charged spacers 420. In another example, multiple first suppliers 320a and multiple second suppliers 320b may be used.

However, the positively charged spacers 410 and the negatively charged spacers 420 may be supplied through one single spacer supplier 320a or 320b. In this case, the positive and negative charges of spacers 410 and 420 may be offset in the one spacer supplier 320a or 320b. Thus, it is preferable to provide the two spacers 410 and 420 respectively through the separate suppliers 320a and 320b.

The sealant is formed on any one of the lower and upper substrates, wherein the sealant having no inlet is formed in a closed type. Once the spacers 400 are sprayed on the lower substrate 220, although not shown, liquid crystal is dispensed onto the lower substrate 220 having the spacers 400 sprayed thereon. Then, the lower substrate 220 is bonded to an upper substrate (not shown), thereby completing the LCD device. Here, the upper substrate can be a color filter array substrate. The LCD device of the present invention can include other known components and structures such as a color filter layer, a block matrix, alignment layers, polarizers, etc.

Second Embodiment

A method of spraying a spacer of an LCD device according to the second embodiment of the present invention is similar to the method according to the first embodiment of the present invention, except that spacers 400 are sprayed on a light-shielding layer 710 of an upper substrate 240 of an LCD device.

Figure 3:
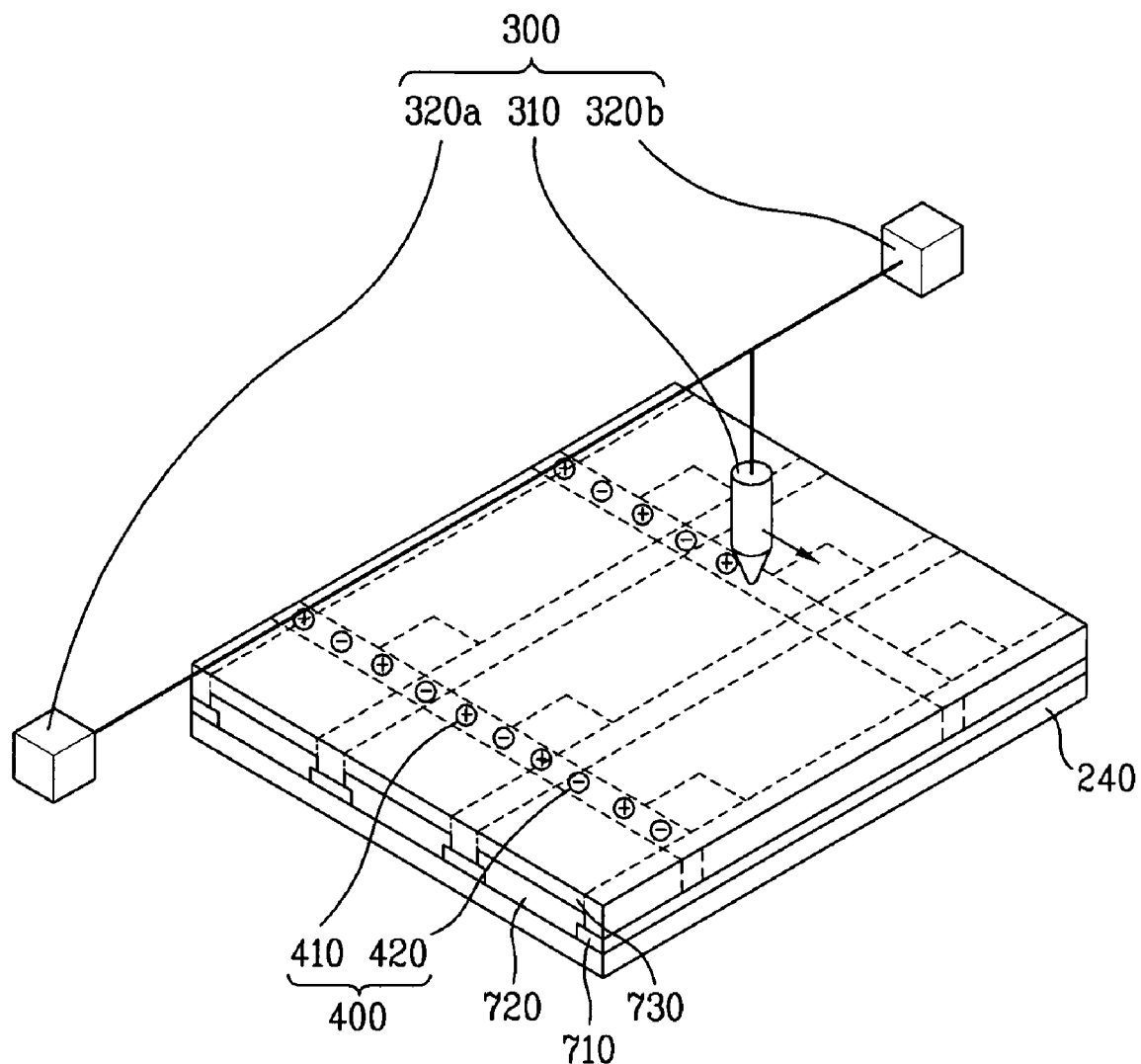
FIG. 3 is a perspective view of roughly illustrating a method of spraying spacers according to a second embodiment of the present invention.

FIG. 3 is a perspective view of roughly illustrating a method of spraying spacers according to the second embodiment of the present invention.

Referring to FIG. 3, ball spacers 400 are sprayed not on a lower substrate (first embodiment) but on an upper substrate 240 of an LCD device by an ink-jet spacer spraying apparatus 300 in the second embodiment. At this time, a sealant (not shown) is preferably formed not in the edge of the lower substrate but in the edge of the upper substrate 240.

According to an embodiment, the upper substrate 240 includes a light-shielding layer 710, a color filter layer 720 and an overcoat layer 730. At this time, the light-shielding layer 710 such as a black matrix prevents the light from leaking in pixel regions. That is, the light-shielding layer 710 is formed corresponding to non-pixel regions, for example, gate lines 610, data lines 620 and thin film transistors 630 formed on the lower substrate 220 (see FIG. 2). Also, the color filter layer 720 is formed corresponding to the pixel regions, for example, pixel electrodes 640 of the lower substrate 220, wherein the color filter layer 720 selectively passes through the light from the pixel region. Generally, the position of the color filter layer 720 in the upper substrate corresponds to the position of the pixel electrodes in the lower substrate, if they are in separate substrates. Then, the overcoat layer 730 is provided to planarize the upper substrate 240 including the light-shielding layer 710 and the color filter layer 720, wherein the overcoat layer 730 is formed on the entire surface of the upper substrate 240.

Although not shown, an alignment layer may be formed on the upper substrate 240, to regularly align liquid crystal molecules at a predetermined direction.

To form spacers for maintaining a certain space between the upper and lower substrates of the LCD device, the spacers 400 are sprayed on the portion corresponding to the light-shielding layer 710 of upper substrate 240 in the same manner as the first embodiment. In consideration of the light-shielding layer 710 corresponding to the gate lines 610, the data lines 620 and the thin film transistors 630 formed on the lower substrate 220, the first and second embodiments have the same effect.

In FIG. 3, the spacers 400 are sprayed on the light-shielding layer 710 corresponding to the gate lines 610. However, the spacers 400 may be sprayed on the light-shielding layer 710 corresponding to the data lines 620, or the data and gate lines 620 and 610, or may be sprayed on the entire area of the light-shielding layer 710. The spacers 400 include the positively and negatively changed spacers 410 and 420, which can be sprayed respectively using one or more spacer suppliers 320a and 320b and the nozzle 310.

In the above-mentioned method of spraying the spacers according to the present invention, the spacers are sprayed on the desired area of a substrate by the ink-jet process, so that it is possible to prevent the picture quality from being degraded.

According to an embodiment, the positively charged spacers can be mixed with the negatively charged spacers, and the mixed spacers can be sprayed on the desired area of the substrate, thereby preventing the spacers from being moved. As a result, it is possible to prevent spots from occurring on the displayed image, and to prevent the luminance from being lowered. That is, after the positively charged spacers are mixed with the negatively charged spacers, the mixed spacers can be sprayed on the substrate, thereby preventing the spots and the deterioration of luminance caused by the movement of spacers.

According to the first embodiments, even if the spacers are sprayed on a flat surface or on an undesired area, the spacers of the present invention are not moved even in case of using the ink-jet process. That is, since both the positively charged spacers and negatively charged spacers are sprayed on the desired area of substrate, it is possible to prevent the spacers from being moved due the electric attractive force (positive and negative charges) between these spacers that are positively charged and negatively charged.

In all embodiments of the present invention, the present method of depositing the spacers 400 can be used in any case or substrate where spacers are desired. Thus, the present invention can be applied to LCDs and other display devices of different types. Also, in one example, when a single nozzle 310 is used, a positively charged spacer from one supplier 320a may be sprayed through the nozzle 310 and then a negatively charged spacer from another supplier 320b may be sprayed through the nozzle 310, and this process may be repeated such that the positively changed spacer and the negatively changed spacer may be alternatingly sprayed by the nozzle 310 unto the substrate.

Also, the method of spraying the spacers according to the present invention does not require a size inspection, if the sprayed spacers have the same size, thereby decreasing the manufacturing cost and simplifying the process.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of manufacturing an LCD device, comprising:
   preparing first and second substrates; and
   spraying mixed spacers on the first or second substrate through an ink jet process,
   wherein the mixed spacers are formed of a mix of positively charged spacers and negatively charged spacers, and
   wherein the number of the positively charged spacers is substantially the same as the number of the negatively charged spacers so as to maintain a balance of electric attractive force between the positively and negatively charged spacers in a non-pixel region.

2. The method of claim 1, wherein the spacers are sprayed together with a volatile solvent.

3. The method of claim 1, wherein preparing the first substrate comprises:
   forming a light-shielding layer on the first substrate; and
   forming a color filter layer on the light-shielding layer.

4. The method of claim 3, wherein the spacers are sprayed on a portion corresponding to the light-shielding layer.

5. The method of claim 1, wherein preparing the second substrate comprises:
   forming gate and data lines on the second substrate, wherein the gate and data lines crossing each other define a unit pixel region;
   forming a thin film transistor adjacent to a crossing of the gate and data lines; and
   forming a pixel electrode being electrically connected with the thin film transistor.

6. The method of claim 5, wherein the spacers are sprayed on a portion corresponding to at least one of the gate line, the data line and the thin film transistor.

7. The method of claim 1, wherein spraying the spacers based on the ink-jet process uses an ink-jet spacer spraying apparatus including at least one spraying nozzle and at least one spacer supplier.

8. The method of claim 7, wherein the spacer supplier includes a first supplier which supplies only the positively charged spacers, and a second supplier which supplies only the negatively charged spacers.

9. The method of claim 1, further comprising:
   forming a sealant having no inlet in any one of the first and second substrates;
   dispensing liquid crystal on the first or second substrate having the spacers sprayed thereon; and
   bonding the first and second substrates to each other.

10. The method of claim 1, wherein the spacers are ball spacers.

11. An apparatus for manufacturing an LCD device, comprising:
- a spacer supplier which supplies positively charged spacers and negatively charged spacers; and
- at least one spraying nozzle which sprays mixed spacers supplied from the spacer supplier on at least one of first and second substrates using an ink-jet process, wherein the mixed spacers are formed of a mix of positively charged spacers and negatively charged spacers,
- wherein the number of the positively charged spacers is substantially the same as the number of the negatively charged spacers so as to maintain a balance of electric attractive force between the positively and negatively charged spacers in a non-pixel region.

12. The apparatus of claim 11, wherein the spraying nozzle sprays the spacers on a portion corresponding to a light-shielding layer formed on the first substrate.

13. The apparatus of claim 11, wherein the spraying nozzle sprays the spacer on a portion corresponding to at least one of a gate line, a data line and a thin film transistor formed on the second substrate.

14. The apparatus of claim 11, wherein the spacer supplier comprises:
- a first spacer supplier which supplies the positively charged spacers; and
- a second spacer supplier which supplies the negatively charged spacers.

* * * * *